United States Patent [19]

Fohl

[11] 4,136,377
[45] Jan. 23, 1979

[54] FOLDABLE PHOTOFLASH LAMP UNIT

[75] Inventor: Timothy Fohl, Carlisle, Mass.

[73] Assignee: GTE Sylvania Incorporated, Danvers, Mass.

[21] Appl. No.: 878,270

[22] Filed: Feb. 16, 1978

[51] Int. Cl.$^2$ ............................................. G03B 15/02
[52] U.S. Cl. ........................................ 362/13; 362/14; 362/16; 362/232; 362/250; 362/270; 362/285; 362/310
[58] Field of Search ....................... 362/11, 16, 13, 14, 362/249, 250, 270, 280, 285, 310

[56] References Cited

U.S. PATENT DOCUMENTS 3,979,583  9/1976  McCan .................................. 362/13

Primary Examiner—Stephen J. Lechert, Jr.
Attorney, Agent, or Firm—Lawrence R. Fraley

[57] ABSTRACT

An electrically-activated photoflash lamp unit including a linear array of lamps positioned within a housing which pivots about the unit's coupling means. The coupling means includes an elongated body member having a connector tab at one end thereof for plugging within a camera's socket. Sequential activation of the lamps is provided by flash-activating pulses from the camera's power source which pass up through the elongated body member and pivot location of the housing to each lamp.

11 Claims, 4 Drawing Figures

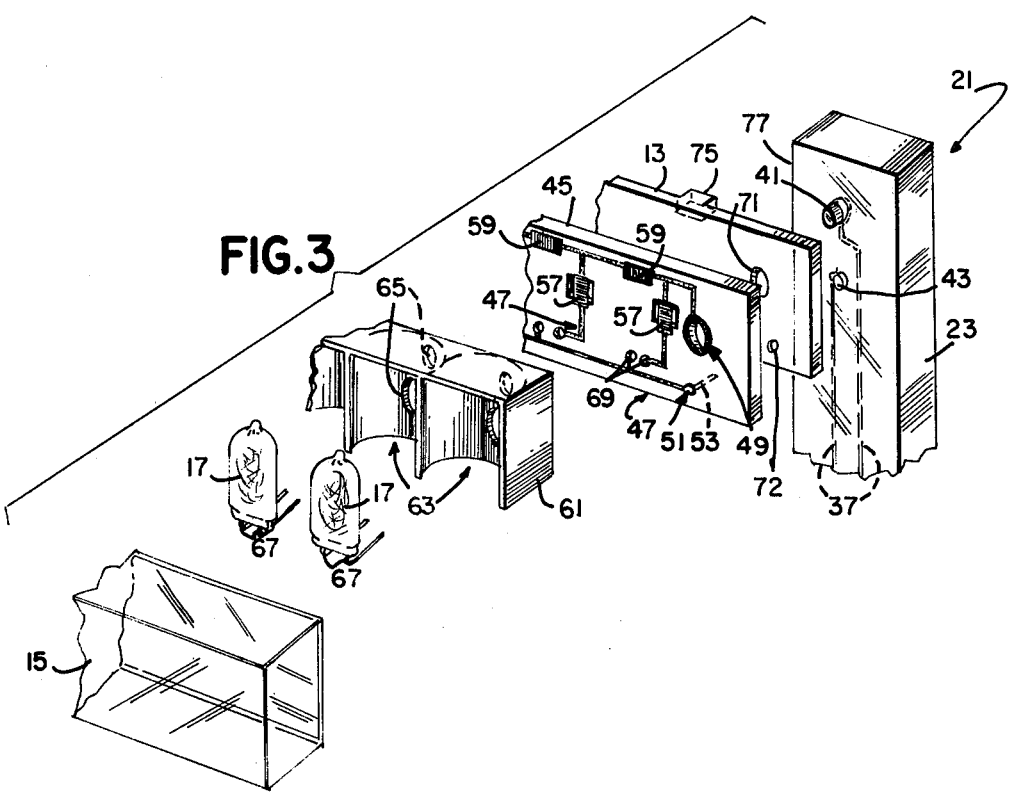
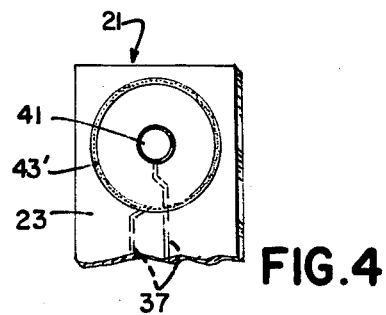

FOLDABLE PHOTOFLASH LAMP UNIT

BACKGROUND OF THE INVENTION

The invention relates to multiple photoflash lamp units and particularly to multiple photoflash lamp units which are electrically activated.

Even more particularly, the invention relates to units of the variety described which are adapted for being mounted atop or inserted within a camera and for receiving flash activating signals from a power source typically associated with many of today's cameras.

Examples of known multiple photoflash lamp units are described and illustrated in U.S. Pat. Nos. 3,857,667 (Vetere et al) and 4,017,728 (Audesse et al), both of which are assigned to the assignee of the present invention. The unit in 3,857,667, popularly known as a "flash bar," includes two opposing linear arrays of electrically-activated flash lamps encased within a light-transmitting housing. This unit is compact in design and has proven to be highly reliable. The unit in 4,017,728, popularly known as a "flip-flash," includes a vertically-oriented, planar array of electrically-activated flash lamps also encased within a transparent housing. The "flip-flash" has also proven highly reliable and was designed primarily to prevent the deleterious photographic condition known as "red-eye." "Red-eye" is a redness of the subject's pupils in the picture and results from the flash of light from the camera's flash unit entering the subject's pupils and illuminating the retinas in the eyes at regions approximately in line with the optical axis of the camera's lens. In other words, "red-eye" most usually occurs when the source of light used with the camera is too close to the camera's lens.

It is believed, therefore, that a photoflash lamp unit which is compact, highly reliable, and capable of substantially eliminating the deleterious photographic result known as "red-eye" would constitute an advancement in the art.

OBJECTS AND SUMMARY OF THE INVENTION

It is a primary object of the invention to provide a multiple photoflash lamp unit possessing the desirable features described above.

Other objects of the invention include providing a photoflash lamp unit which is easy to operate even for the novice photographer and which can be produced relatively inexpensively.

In accordance with one aspect of the invention, a photoflash lamp unit is provided which comprises a housing having therein an array of electrically-activated flash lamps. The housing is pivotally oriented on the body portion of a coupling means which is adapted for transmitting flash-activating signals from the unit's mounting device to the lamps.

BRIEF DESCRIPTION OF THE DRAWINGS

FIG. 3 is an exploded isometric view of the invention of FIGS. 1 and 2; and

FIG. 4 represents an alternate embodiment of the pivot-rod and fixed contact arrangement for use with the invention.

DETAILED DESCRIPTION OF THE PREFERRED EMBODIMENTS

Figures 1, 2:
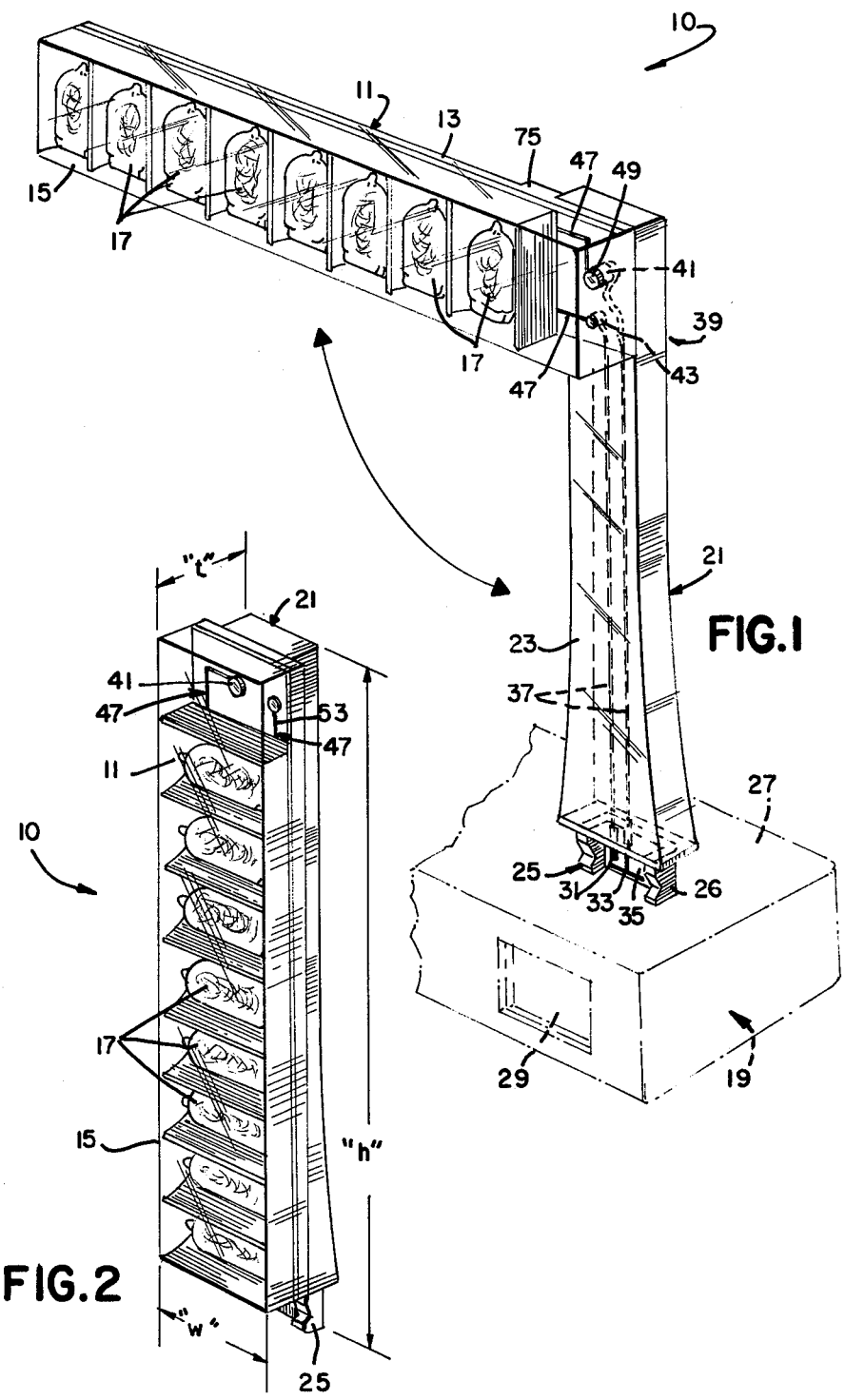
FIG. 1 is an isometric view showing a preferred embodiment of the invention in an open, firing position.
FIG. 2 is an isometric view of the embodiment of FIG. 1 in the closed position.

For a better understanding of the present invention together with other and further objects, advantages and capabilities thereof, reference is made to the following disclosure and appended claims in connection with the above described drawings.

With particular reference to FIG. 1, there is shown a multiple photoflash lamp unit 10 in accordance with a preferred embodiment of the invention. Unit 10 comprises a housing 11 which includes a base portion 13 and a light-transmitting cover portion 15, both of which are preferably of plastic material. Located within housing 11 is an array of electrically-activated flash lamps 17 which are preferably arranged in the linear manner depicted. As also shown, eight lamps 17 are utilized although it is realized that this number can of course vary.

Unit 10 is adapted for mounting atop or within a camera 19 (shown in phantom) with each of the unit's lamps being fired by the flash-activating signals transmitted from the camera's power source (not shown). Usually this source is located within the camera and in the most recent designs comprises a piezoelectric crystal. Mechanical activation of the crystal produces an electrical pulse sufficient to fire at least one of the lamps 17. This actuation is usually coordinated to occur simultaneously with the movement of a part of the camera such as the shutter release mechanism. If a piezoelectric crystal or similar supply is employed, a pulse of about 1000–2000 volts is produced. Accordingly, the preferred lamps 17 for use in the invention are of the high voltage type, with suitable examples illustrated and described in U.S. Pat. Nos. 4,014,638 (J. W. Shaffer), 4,008,040 (D. E. Murray et al), and 3,955,912 (D. E. Armstrong et al), all of which are assigned to the assignee of the invention. If a battery or similar supply is employed as the camera's power source, the result is a low voltage pulse and the preferred lamps 17 are of the low voltage type. An example is shown and described in U.S. Pat. Nos. 3,897,196 (J. P. Saunders et al), said patent also assigned to the assignee of the present invention.

To provide lamps 17 with the required activating pulses from the power source of camera 19, unit 10 includes a coupling means 21 which has a body portion 23 and a mounting device 25 at one end thereof. Device 25 is adapted for inserting within a corresponding socket portion of camera 19, said socket portion usually provided within a top surface 27 of the camera. The flash-activating pulses from the camera's power source will thus be transmitted to device 25, up through the elongated body portion 23, and thereafter to the respective lamps 17. Housing 11 is pivotally oriented on body portion 23 at an end opposite that of mounting device 25. Accordingly, body 23 serves to space the linear lamp array at a sufficient distance from the camera's lens 29 to substantially eliminate "red-eye." In one embodiment of the invention, lamps 17 are located at a distance of about 4 inches. Being pivoted, housing 11 is thus capable of being moved from the first, open firing position of FIG. 1 to a closed, non-firing position (shown in FIG. 2). As such, the unit is very compact and readily adaptable to being carried by the user of camera 19. As typical examples of such compactness, unit 10 in the closed position has a width (dimension "w") of about 0.875 inches, a thickness (dimension "t")

of 0.875 inches, and an overall height (dimension "h") of 4.50 inches.

Mounting device 25 preferably comprises a connector tab 26 including at least two conductive terminals 31 and 33 which mate with corresponding circuitry within the camera's socket portion when unit 10 is positioned thereon.

Terminals 31 and 33 preferably comprise printed circuitry established on a flat surface 35 of the electrically insulative device 25. Connected to each terminal is an elongated conducting lead 37, said leads located within body 23 and extending therethrough. Leads 37 may comprise conductive wiring (e.g. copper) or printed circuitry similar to terminals 31 and 33.

The flash-activating pulses from camera 19 pass through the location 39 at which housing 11 pivots on coupling means 21. In comparing FIGS. 1–3, the positive electrical connection between leads 37 and each lamp 17 is accomplished by providing an electrically conductive rod member 41 and a spaced, fixed contact 43 within body portion 23 of means 21. Accordingly, housing 11 pivots about rod 41 and is electrically joined thereto. The rod, in turn, is also electrically connected to terminal 33 via one of the conducting wires 37. Fixed contact 43 is connected electrically to terminal 31 through a second lead 37. In the embodiment of FIGS. 1–3, lamps 17 can only be fired when housing 11 is the first (firing) position of FIG. 1. Connection to lamps 17 is assured by providing a printed circuit board 45 having lamp firing circuitry 47 thereon. Circuitry 47 is connected at one end 49 to rod 41 and at another end 51 to a contact pin 53 (FIG. 3) which is secured within board 45 and makes contact with the fixed contact 43 in means 21 only when housing 11 is aligned in the described firing position. When the housing assumes the compact, non-firing position of FIG. 2, contact pin 53 has been disengaged and removed from contact 43. As a result, an open circuit occurs and lamp activation is prevented.

The circuitry 47 on board 45 operates in much the same manner as the circuitry described in the aforementioned U.S. Pat. No. 4,017,728 and the disclosure of said patent is therefore incorporated herein by reference. Circuitry 47 includes radiation switches 57 similar to those in U.S. Pat. No. 4,017,728, each of these components being in the normally closed position until the intense heat from an adjacent, flashed lamp 17 melts the switch and provides an open path thereacross. Circuitry 47 also includes a second plurality of radiation switches 59, each positioned adjacent a respective lamp 17. Switches 59 are preferably of the compositions described in U.S. Pat. No. 4,017,728 and are normally open until activated by the radiant energy from a flashed lamp.

To enhance illumination by lamps 17 through the light-transmitting cover 15, it is preferred to utilize a reflector 61 having a plurality of individual reflective regions 63 therein each adapted for having a respective lamp 17 located therein. Reflector 61 includes a pair of windows 65 within each region 63 to permit passage therethrough of the radiant energy from the flashed lamp 17 to in turn activate the respective switches 57 and 59. The projecting leads 67 of each lamp 17 are secured within corresponding apertures 69 within board 45 and connected to the circuitry 47 at these locations. Leads 67 are bent such that the longitudinal axis of each lamp lies parallel to the plane of board 45.

In assembly, lamps 17 are secured within board 45 and reflector 61 located in position such that each region 63 houses a single lamp. This assembly is then located on base 13 so that the opening in board 45 adjoining end 49 of circuitry 47 aligns with a corresponding opening 71 within base 13. Similarly, pin 53 is aligned within an opening 72 also provided within base 13. Understandably, rod 41 projects through opening 71 in base 13 and the opening in board 45 about which end 49 of circuitry 47 is positioned. Fixed contact 43 is almost flush with the surface of body 23 and thus abuts the end of pin 53 which projects through opening 72.

The embodiment of FIG. 4 represents one version of how contact may be maintained between the pin 53 in housing 11 and the respective conducting lead 37 when unit 10 is in both the open and closed positions. This is achieved by providing a fixed contact 43' which is substantially circular in configuration and has rod 41 at its center point. Thus, no matter how housing 11 is oriented with respect to coupling means 21, the contact pin 53 (FIG. 3) will remain electrically joined to the circular contact 43', through a sliding, frictional connection.

In the firing position of FIG. 1, housing 11 and the linear array of lamps therein are perpendicular to the upright coupling means 21. When folded to the closed position of FIG. 2, housing 11 is parallel to and adjacent coupling means 21. Understandably, the embodiment of FIG. 4 permits the lamp array to be fired at all locations of housing 11 relative to means 21, including that shown in FIG. 2.

Unit 10 includes a stop member 75 which projects from base 13 and engages a side 77 of body portion 23 to stop housing 11 at the positions of FIGS. 1 and 2.

Thus there has been shown and described a foldable photoflash lamp unit which is compact in design, relatively inexpensive to produce, and which substantially eliminates the possibility of "red-eye." Like the aforementioned "flash bar" and "flip-flash" devices, the present invention is highly reliable and may be successfully operated by even the novice photographer.

While there have been shown and described what are at present considered the preferred embodiments of the invention, it will be obvious to those skilled in the art that various changes and modifications may be made therein without departing from the scope of the invention as defined by the appended claims.

What is claimed is:

1. A foldable photoflash lamp unit for substantially eliminating red-eye photographic results, said lamp unit comprising:
    a housing including a base portion and a light-transmitting cover portion;
    an array of electrically-activated flash lamps positioned within said housing; and
    elongated coupling means including a body portion and a mounting device at a first end of said body portion for mounting atop or within a camera, said coupling means adapted for transmitting flash-activating signals from said mounting device to each of said flash lamps within said housing, said housing pivotally oriented on said coupling means and adapted for occupying first and second positions relative thereto, said flash-activating signals passing through the location of said pivot when said housing occupies said first position.

2. The photoflash lamp unit according to claim 1 wherein said array is linear.

3. The photoflash lamp unit according to claim 2 wherein said housing is substantially prependicular to said body portion of said coupling means when said housing occupies said first position.

4. The photoflash lamp unit according to claim 2 wherein said housing is substantially parallel to and immediately adjacent said body portion when said housing occupies said second position.

5. The photoflash lamp unit according to claim 1 further including a reflector positioned within said housing relative to each of said flash lamps for enhancing the light output from said flash lamp toward said light-transmitting cover portion.

6. The photoflash lamp unit according to claim 1 wherein said coupling means further includes an electrically conductive rod member located within a second end of said body portion opposite said first end, said housing pivoting about said rod member.

7. The photoflash lamp unit according to claim 6 wherein said coupling means further includes a fixed electrical contact located within said body portion adjacent said conductive rod member.

8. The photoflash lamp unit according to claim 7 wherein said mounting device comprises a connector tab including first and second conductive terminals thereon, said first and second conductive terminals electrically joined to said conductive rod member and said electrical contact, respectively.

9. The photoflash lamp unit according to claim 7 further including a circuit board within said housing having lamp-firing circuitry thereon electrically connected to said conductive rod member and said fixed electrical contact when said housing occupies said first position, each of said flash lamps electrically connected to said lamp firing circuitry.

10. The photoflash lamp unit according to claim 8 wherein said coupling means further includes first and second elongated conducting leads located within said body portion, said first conducting lead electrically connecting said first terminal within said connector tab to said rod member, said second conducting lead electrically connecting said second terminal with said connector tab to said electrical contact.

11. The photoflash lamp unit according to claim 1 further including a stop member located on said base portion of said housing for engaging said body portion of said coupling means to stop said housing at said first and second positions.

* * * * *